United States Patent [19]

Brown et al.

[11] Patent Number: 4,691,344
[45] Date of Patent: Sep. 1, 1987

[54] LOW-POWERED REMOTE SENSOR AND TELEPHONE LINE TRANSMITTER

[75] Inventors: Richard W. Brown, Mound; Duane R. Ardolf, Maple Grove, both of Minn.

[73] Assignee: Aquatrol Corporation, Arden Hills, Minn.

[21] Appl. No.: 821,429

[22] Filed: Jan. 21, 1986

[51] Int. Cl.$^4$ .................................... H04M 11/00
[52] U.S. Cl. ............................... 379/106; 379/98; 379/413
[58] Field of Search ............... 179/2 A, 2 AM, 2 BC, 179/2 C, 2 DP; 379/37, 39, 49, 50, 92, 93, 97, 98, 106, 107, 413; 340/870.2, 870.24

[56] References Cited

U.S. PATENT DOCUMENTS

| | | |
|---|---|---|
| 2,326,200 | 8/1943 | Bristol . |
| 3,641,270 | 2/1972 | Ohshima et al. ........... 179/2 A |
| 3,647,971 | 3/1972 | Cushman et al. ........... 179/2 A |
| 3,717,858 | 2/1973 | Hadden .............. 340/870.24 X |
| 3,800,091 | 3/1974 | Glidden et al. ........... 179/2 A X |
| 3,870,822 | 3/1975 | Matthews ............... 179/2 BC X |
| 4,091,357 | 5/1978 | Nakajima et al. ...... 340/870.24 X |
| 4,147,893 | 4/1979 | Matson .................. 179/2 A |
| 4,521,643 | 6/1985 | Dupuis et al. ........... 179/2 DP |
| 4,547,629 | 10/1985 | Corless ............... 179/2 BC X |
| 4,549,044 | 10/1985 | Durham ............... 179/2 AM X |
| 4,578,539 | 3/1986 | Townsing .............. 179/2 A |

FOREIGN PATENT DOCUMENTS

1370956 10/1974 United Kingdom ............ 179/2 BC

OTHER PUBLICATIONS

Freer et al, "Local Battery Charging Over Subscriber Lines", *The Post Office Electrical Engineer's Journal* (UK), vol. 66, Part 2, Jul. 1973, pp. 73-76.

*Primary Examiner*—Keith E. George
*Attorney, Agent, or Firm*—Merchant, Gould, Smith, Edell, Welter & Schmidt

[57] ABSTRACT

A data transmitter unit (22) for transmitting data over conventional telephone lines (26) from a remote location (24) to a central location (28). The data transmitter unit (22) derives its operational power supply from the telephone lines (26) to which it is interconnected, thereby doing away with the requirement for a separate power supply. The transmitter unit (22) includes ring detect circuitry (46) for detecting a ring signal on the telephone line (26). The ring detect circuitry (46) cooperates with the stand by power supply (38) charged by a charging circuit (36) to energize a logic module (44) and analog converter circuitry (40, 42) which is interconnected to sensors (30, 32). The logic module (44) controls operation of a tone generator (48) which transmits frequency signals representative of the input received from the sensors (30, 32) over the telephone lines (20, 26) to a central location (28).

6 Claims, 10 Drawing Figures

LOW-POWERED REMOTE SENSOR AND TELEPHONE LINE TRANSMITTER

BACKGROUND OF THE INVENTION

The present invention relates to a telephone line transmitter for transmitting data over telephone lines. More particularly, the present invention relates to a low-powered remote sensor and telephone line transmitter which does not require any external power supply, other than being interconnected to a telephone line.

Telephone line data transmitting systems require some type of external power supply. Typically, this will either be a 120 volt AC power supply or a DC battery. This necessitates either the placement of a distribution transformer at each of the transmitting units (in the case of the 120 volt AC power supply) or periodic servicing of a battery at the transmitting unit (in the case of a DC battery). Other power supply sources, such as solar cells, also require periodic maintenance and are subject to vandalism or the like.

Additionally, the requirements for an FCC certification, in particular, a Part 68 registration, are very stringent. They require that the transmitter unit exhibit more than 10 megaohms at 100 volts DC when "on hook." In addition, there are stringent requirements for lightening and surge protection. When a ring signal is received, the transmitter unit must exhibit 40K ohms to 1600 ohms on hook AC impedance for the standard ring frequency of 16 to 68 hertz and 40 to 150 volts. When the transmitter unit goes "off hook", it must provide a resistance less than 200 ohms at 600 ohms reflected impedance. As a practical matter, this means that the unit must operate down to 2 volt DC line voltages.

Another problem often encountered in developing a remote telephone line transmitter unit is the temperature instability frequently exhibited by voltage to frequency converters.

The present invention overcomes these and many other problems associated with remote telephone line transmitter systems.

SUMMARY OF THE INVENTION

The present invention relates to a data transmitting system for transmission of data over conventional telephone lines from a remote location to a central location, the data transmitting system deriving its operational power supply from the telephone line, thereby doing away with the requirement for a separate power supply. The data transmitting system includes ring detector means interconnected to the telephone line for detection of a ring signal sent over the telephone line to the remote location from a central location. The data transmitting system includes sensor means for providing an analog output representative of a sensed condition. Converter means is interconnected to the ring detector means and the sensor means for conversion of the analog output received from the sensor means to a corresponding frequency value. Frequency transmission means is interconnected to the telephone line for transmission on the telephone lines of frequency signals representative of the frequency values received from the converter means. Power means is interconnected to the frequency transmission means and the sensor means for storing power at the end of a transmission cycle and for powering the sensor means at the next subsequent transmission cycle. The power means includes capacitor means charged to a predetermined voltage.

A particularly advantageous feature of the present invention is that it does not require any external power source or supply. The transmitter system of the present invention derives its power from the telephone lines to which it is interconnected.

Yet another advantage of the present invention is that it meets the FCC requirements for Part 68 registration in that the transmitter system exhibits greater than 10 megaohms at 100 volts DC when "on hook." In addition, when a ring signal is received, the unit exhibits 40K ohms to 1600 ohms on hook AC impedance for the standard ring frequencies of 16 to 68 hertz and 40 to 150 volts. When the transmitter unit goes "off hook", it provides a resistance of less than 200 ohms at 600 ohms reflected impedance.

Yet another particularly advantageous feature of the present invention is that it will accurately convert analog signals to a useful tone which can be telemetered to a central location. One embodiment of the present invention utilizes analog converters for conversion of the voltage values received from appropriate sensors to corresponding frequency values. In one embodiment, the analog converter converts the sensor voltage to a 4 to 40 hertz frequency and operates on 5 volt logic levels.

Yet another embodiment of the present invention exhibits temperature stability over a wide range of temperatures, such as from 32 to 130 degrees Fahrenheit.

In one embodiment, the energy for the transmitter system operation is derived from a capacitor which is charged to approximately 20 volts DC. The capacitor stores power at the end of a transmission cycle and maintains a predetermined voltage level, preferably 20 volts DC, for the next transmission cycle and still meets the requirements of 10 megaohms "on hook."

These and various other advantages and features of novelty which characterize the present invention are pointed out with particularity in the claims annexed hereto and forming a part hereof. However, for a better understanding of the invention, its advantages and objects attained by its use, reference should be had to the drawings which form a further part hereof and to the accompanying descriptive matter in which there is illustrated and described several embodiments of the present invention.

BRIEF DESCRIPTION OF THE DRAWINGS

In the drawings, in which like reference numerals and letters indicate corresponding parts throughout the several views.

DETAILED DESCRIPTION OF A PREFERRED EMBODIMENT OF THE INVENTION

Figure 1:
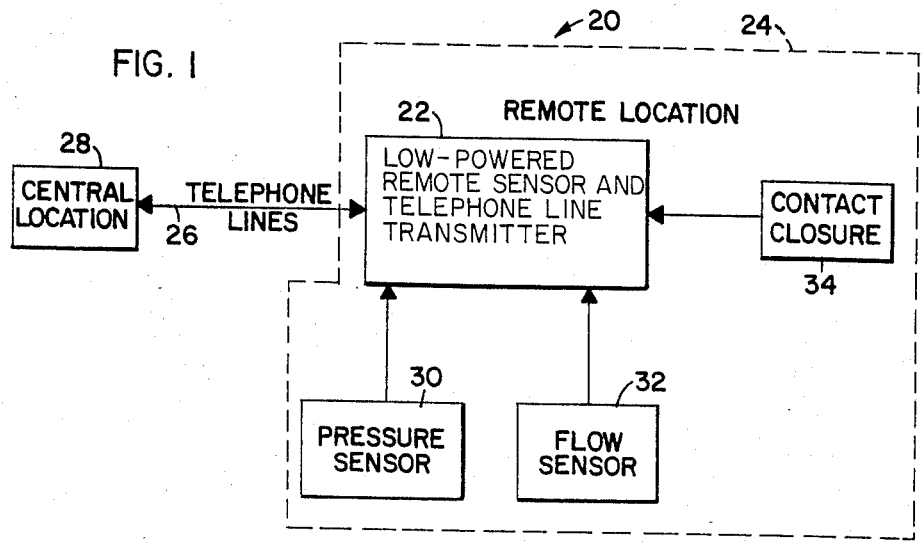
FIG. 1 is a block diagram illustrating use of transmitter circuitry in accordance with the principles of the present invention in association with sensor means for monitoring fluid pressure and flow, and a contact closure for monitoring fluid flow direction.

Referring now to the drawings, there is illustrated in FIGS. 1 through 9 an embodiment of an low-powered remote sensor and telephone line transmitter in accordance with the principles of the present invention. The low-powered remote sensor and telephone line transmitter is illustrated as being used in a particular application, the application generally being designated by the reference numeral 20. The application 20 shown includes an embodiment of the low-powered remote sensor and telephone line transmitter circuitry 22 at a remote location 24 interconnected by conventional telephone lines 26 to a central location 28. At the remote location, the transmitter circuitry 22 is shown interconnected to a fluid pressure sensor 30, a fluid flow sensor 32 and a contact closure 34 indicating fluid flow direction. However, it will be appreciated that the transmitter circuitry 22 might be interconnected to various sensor and contact closure arrangements and still be in keeping with the principles of the present invention. In the application illustrated, the transmitter circuitry 22 might be mounted on a telephone pole or the like and wired to the sensors 30, 32 and the contact closures 34 which might be positioned in a manhole in the street. The transmitter circuitry 22 will convert analog signals received from the sensors 30, 32 and signals received from the contact closure 34 to a series of tones (frequency signals) representative of the individual sensor readings and the contact closure state, the tones being telemetered over the telephone lines 26 to the central location 28 where the tones can be suitably interpreted by any number of conventional methods.

Figure 9:
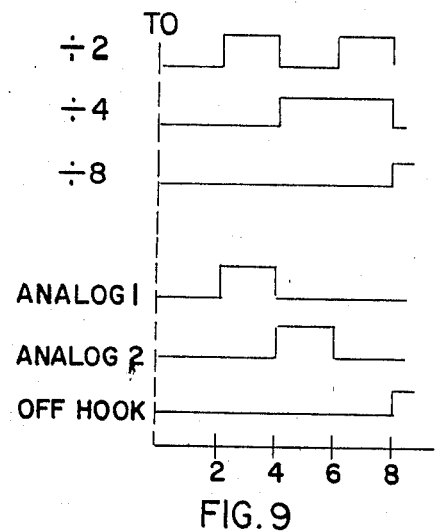
FIG. 9 is a timing diagram illustrating timing operation of the embodiment shown.
Figure 2:
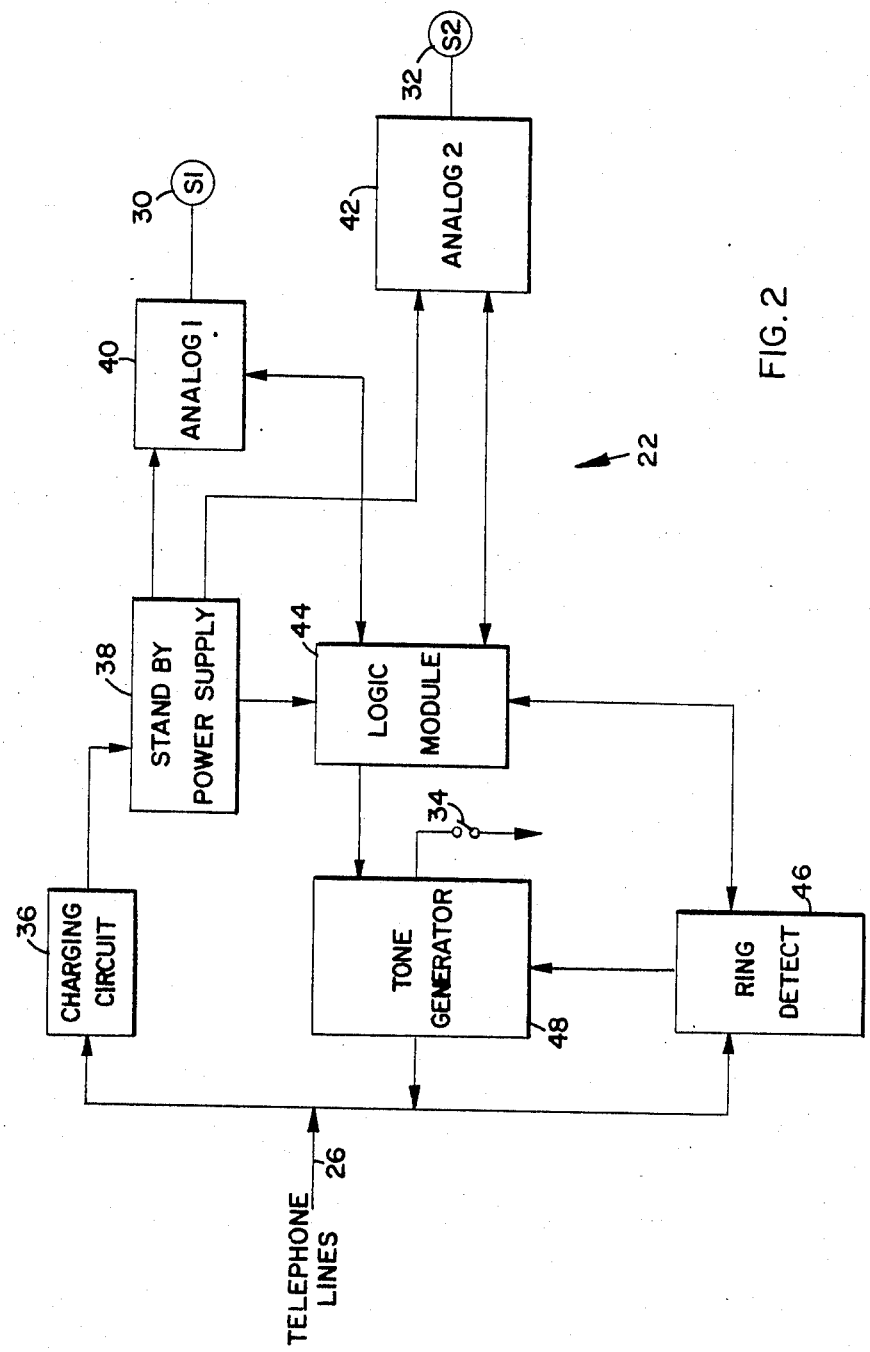
FIG. 2 is a functional block diagram of an embodiment of a transmitter system in accordance with the principles of the present invention.

Illustrated in FIG. 2 is a functional block diagram of an embodiment of the transmitter circuitry 22. The transmitter circuitry 22 includes a charging circuit 36 interconnected to the telephone lines 26 for charging a stand-by power supply 38 for storing power for use in providing energy for analog converter circuitry 40, 42, also referred to herein as ANALOG 1 and ANALOG 2, and for a logic module 44. When a ring signal is detected on the telephone lines 26 by the ring detect circuitry 46, a tone generator 48 and the logic module 44 are energized, bringing the transmitter circuitry 22 to an "off hook" condition. As illustrated in FIG. 9, the logic module 44, which controls the operation of the tone generator 48, then provides a two second billing delay per FCC Part 68 requirements. The logic module 44 then causes the frequency outputs of ANALOG 1 and ANALOG 2 to be transmitted in sequence as an oscillating signal to the tone generator. After the sequence is completed, the logic module 44 de-energizes the tone generator 48 and allows the tone generator 48 of the transmitter circuitry 22 to go "on hook". As the telephone line voltage attempts to rise to its customary 50 volts, the charging circuit 36 provides energy to the stand-by power supply 38 until it is sufficiently charged for the next ring signal cycle, the stand-by power supply 38 being capable of saving its charge or storing power until the next transmission cycle. The charging circuit 36 then goes "on hook" in that it exhibits greater than ten megaohms across the telephone lines 26. The transmitter circuitry 22 is then ready for the next ring signal, which might be initiated from the central location 28 when information from the sensors 30, 32 and the contact closure 34 is required.

Figure 3A:
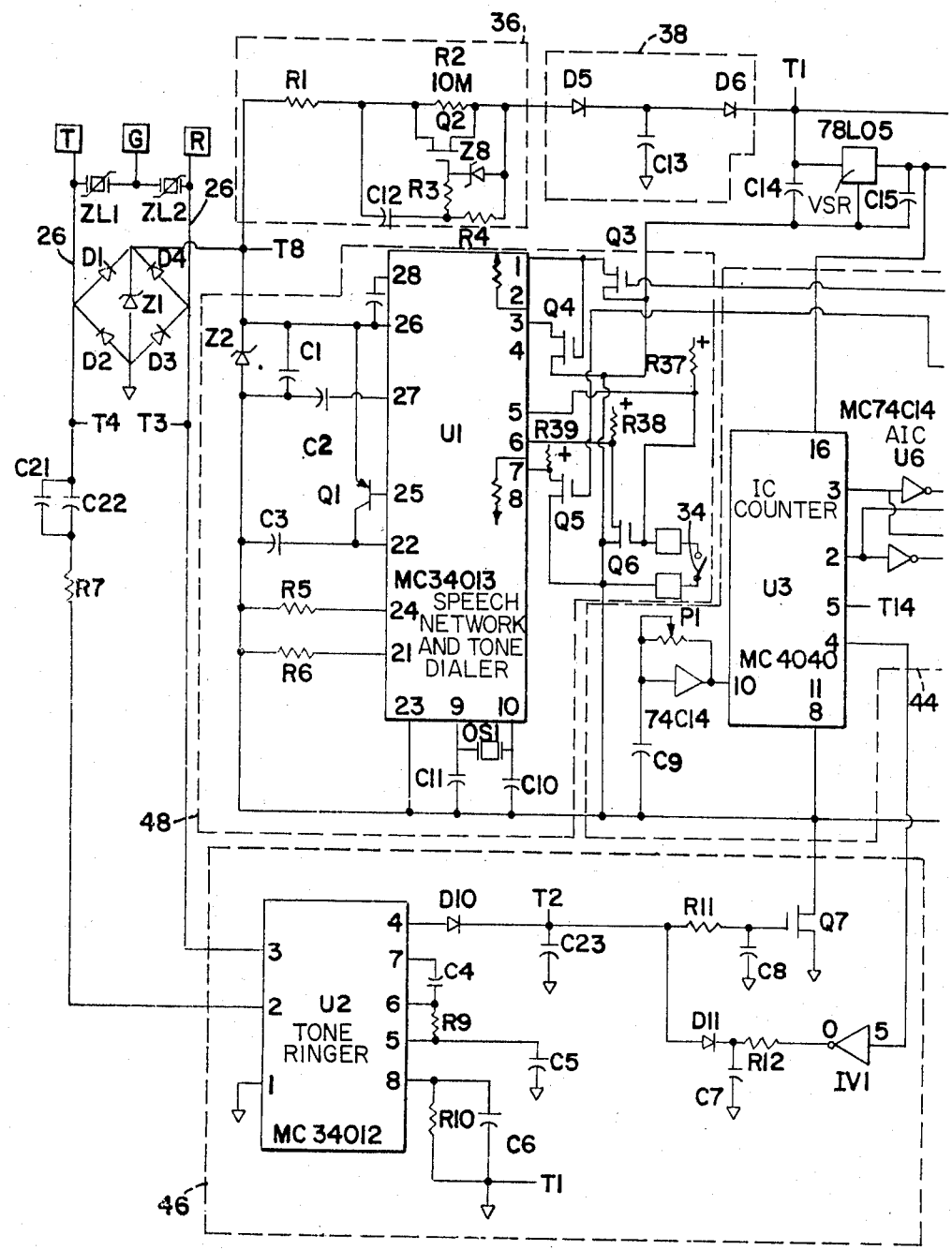
FIGS. 3A, 3B are electrical circuit diagrams of an embodiment of transmitter circuitry in accordance with the principles of the present invention.

More particularly, a detailed circuit diagram of an embodiment of the transmitter circuitry 22 is illustrated in FIGS. 3A, B. The tip (T) and ring (R) of the telephone lines 26 are interconnected to a diode bridge D1, D2, D3 and D4 through protection zenners ZL1 and ZL2 via ground (G), which prevent high voltage spikes from damaging the transmitter unit 22. The ring signal is further imposed on capacitors C21 and C22 across 200 volts and through resistor R7 to the ring detect circuitry 46, thus allowing only AC components to the ring detect circuitry 46.

Figure 4:
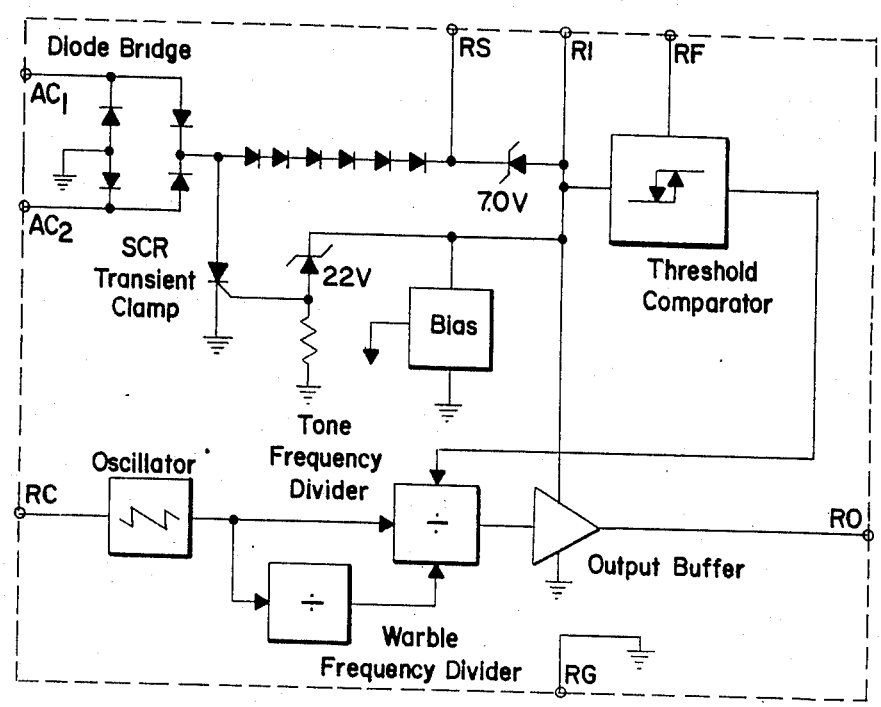
FIG. 4 is a block diagram of a telephone tone ringer function.
Figure 7:
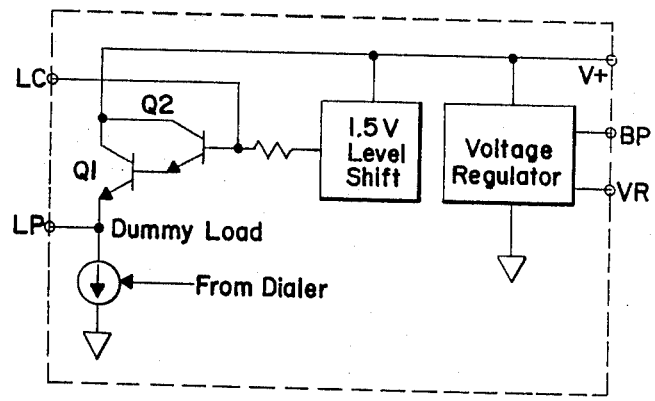
FIG. 7 is a block diagram of a DC line interface function.
Figure 6:
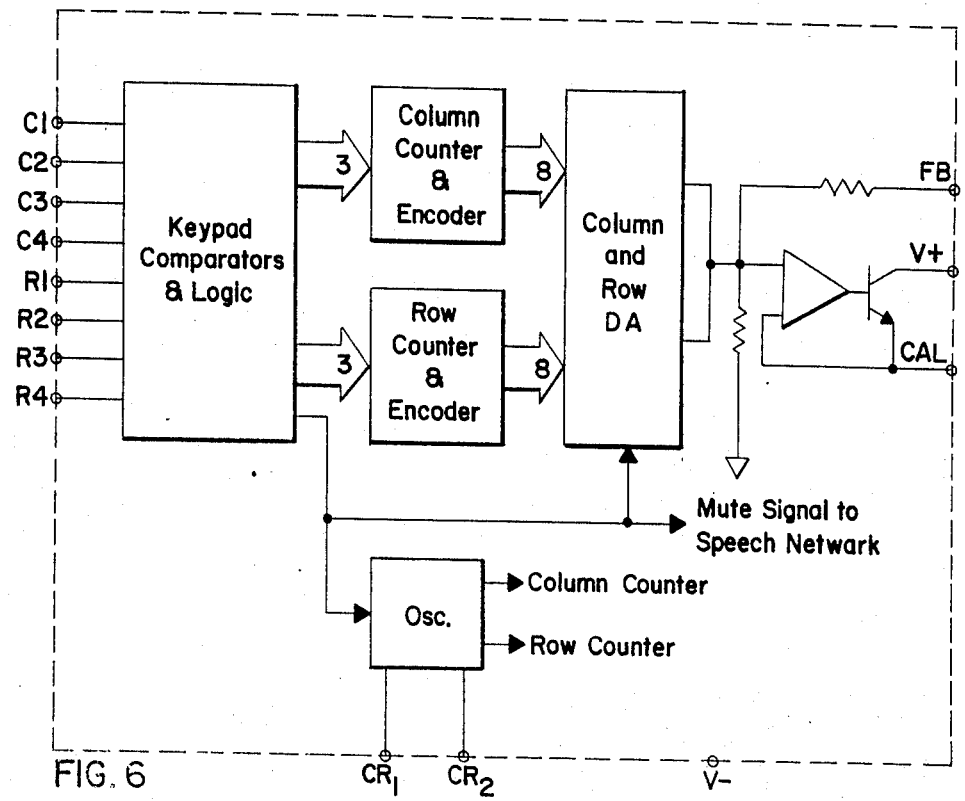
FIG. 6 is a block diagram of DTMF dialer function.
Figure 5:
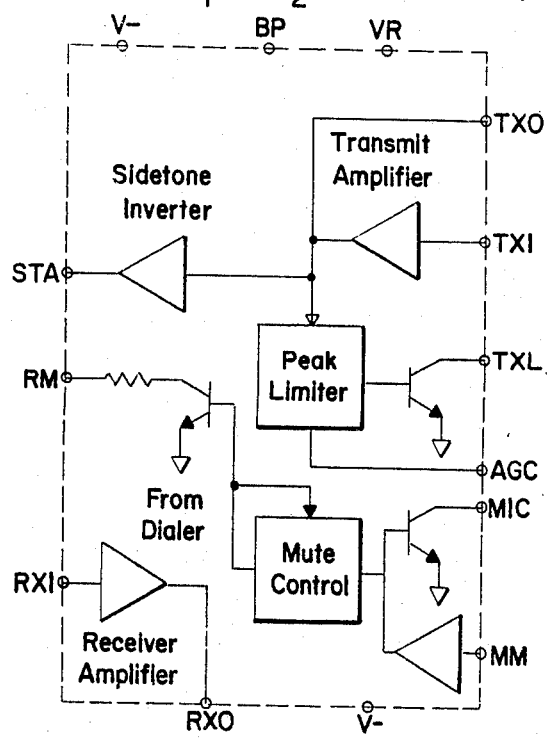
FIG. 5 is a block diagram of a speech network function.

In the embodiment shown, the ring detect circuitry 46 includes a Motorola MC34012 telephone tone ringer integrated circuit package (U2), a block diagram of which is illustrated in FIG. 4. Capacitors C4 and C5 and resistor R9 act as filter and threshold detect circuitry to allow only valid ring signals to be detected. In a standard application of the integrated circuit U2, an oscillating output is provided at terminal four (R0) in FIG. 4. In the ring detect circuitry 46, capacitor C6 and resistor R10 allow a long DC pulse to be provided at terminal four (R0) when a ring is detected. Diode D10 allows this DC pulse to charge capacitor C23. A short time delay is provided by resistor R11 and capacitor C8 before field effect transistor (FET) Q7 can be turned to a conducting state by the positive gate voltage. This provides a ground for the logic module 44 and the tone generator 48, thus energizing these circuits.

The tone generator 48 includes a MC34013 speech network and tone dialer integrated circuit package (U1). The integrated circuit U1 provides analog amplifiers for speech transmission, a frequency synthesizer for dial tone via frequency (DTMF) dialing, and a DC line interface circuit which terminates the telephone line, block diagrams of each function being illustrated in FIGS. 5 through 7. When FET Q7 is energized, the tone dialer function goes "off hook" and regulates the telephone lines 26 to the "off hook" condition by conducting through transistor Q1 and resistor R5. Capacitors C1 and C2 act as AC bypass capacitors. Capacitor C3 is a frequency compensator for the voltage regulator. Resistor R6 controls the amplitude of the dialer output. The oscillator (OS1) on terminals nine and ten provides the frequency generation for the dial tones. Inputs one through four (C1-C4 in FIG. 6) provide the keypad column inputs and are pulled up through an internal resistor while inputs five through eight (A1-A4 in FIG. 6) are row inputs and are pulled down through a second internal resistor. The contact closure 34, is connected so that when open, a pull up through R37 is provided on terminal five and FET Q6 is conducting, so as to pull terminal six to common. When the contact closure 34 is closed, the FET Q6 is deenergized and terminal six is pulled high through the resistor R38 and terminal five is pulled to common. The FET Q5 is energized by the oscillating input from terminal nine of U4 which in the embodiment shown is a MC4040 integrated circuit. This provides an alternating on and off, square wave, signal to terminal seven of U1. FETs Q3 and Q4 are a complementary pair energized by ANALOG 1 inputs. When the ANALOG 1 input is high, the FET Q3 is conducting, causing the FET transistor Q4 to turn off, whereby the terminal one is low and the terminal three is high. When the ANALOG 1 circuitry 40 is low, the opposite condition exists.

The dialer function of the tone generator 48 is set up so that when any two inputs in the same row or column are initiated, a single tone is sent, whereas, when a single row or column is initiated, a dual tone is sent. Thus, the following sequence of tones will be sent by the tone generator 48. When the contact closure 34 is open and the ANALOG 1 input is high and the oscillating input to Q5 is high, 697 Hz. and 1209 Hz. tones will be sent. When the oscillating input goes low, only the 697 Hz. tone will be sent. When the contact closure 34 is open and the ANALOG 1 is low and oscillating input high, 852 hertz and 1209 hertz tones will be sent. When the oscillating input is low, an 852 Hz. tone is sent. When the contact closure 34 is closed, the ANALOG 1 circuitry 40 input is high and the oscillating input is high, 697 hertz and 1336 hertz tones are sent. When the oscillating input goes low, a 697 Hz. tone is sent. When the contact closure 34 is closed and the ANALOG 1 circuitry 40 is input low and the oscillating input is high, 852 Hz. and 1336 Hz. tones are sent. When the oscillating input goes low, an 852 Hz. tone is sent. It can thus be seen from the above that all the combinations of signals might be discerned by the combination of tones which are generated.

When the transistor Q7 is energized, the ground is provided for the logic module 44, comprising integrated circuitry counters U3 and U4, which might be Motorola MC4040 integrated circuit packages. An oscillator on terminal 10 of U3 is provided by P1 and C9 utilizing a 74C14 inverting Schmidt trigger. Terminal 3 divides the clock pulse by 32. P1 is adjusted for a two second on and a two second off output at terminal 3. Terminal 2 divides the clock pulse by 64 and terminal 5, which is used for test purposes, divides the clock pulse by 16 and terminal 4 divides the pulse by 128. This is illustrated in the timing diagram of FIG. 9, whereby T0 is time zero. The integrated circuits, labeled AIC in FIGS. 3A–3B, U5 and U6, which might be MC74C00 and MC74C14 integrated circuit packages, respectively, provide alternate outputs to the ANALOG 1 circuitry 40 and the ANALOG 2 circuitry 42, as shown in the timing diagram. An output is also provided from terminal 4 to an "off hook" logic inverter (IV1).

When a positive output is provided to FET transistor Q8, Q8 is in a conducting mode energizing the ANALOG 1 circuitry. A 4 to 40 hertz oscillating signal is provided at diode D7. This alternately energizes and de-energizes FET Q11, providing a clock input for integrated circuit U4. The output on terminal nine of U4 is divided by two, but is a square wave providing an oscillating input to the tone generator module 48. After two seconds, FET transistor Q8 is de-energized and FET transistor Q9 is energized, thus allowing the ANALOG 2 circuitry 42 to be generated to diode D8 through integrated circuit U4 to the tone generator circuitry 48. After a total of eight seconds has elapsed, terminal 4 of integrated circuit U3 goes high causing the output of the inverter (IV1) to go low. The ring hold capacitor C21 is thus discharged through diode D11 and resistor R12, allowing the gate voltage on transistor Q7 to go low, de-energizing FET transistor Q7 and going "on hook". Diode D11 prevents leakage current from the stand-by power supply when the FET transistor Q7 is deenergized. The resistor R7 and the capacitor C7 are necessary to provide the short time delay when the FET transistor Q7 is first energized to prevent the gate discharging the capacitor C21.

The charging circuit 36 is energized by the DC potential on the bridge output. When the FET transistor Q7 is de-energized and the transmitter circuitry 22 tries to go "on hook" a rising voltage is sensed at resistor R1. This current through capacitor C12 and resistor R3 provides a gate voltage for FET transistor Q2, thus shorting out resistor R2 and allowing full line voltage to be impressed through diode D5 onto the standby power supply capacitor C13. As the line voltage continues to rise, the current through capacitor C12 allows the capacitor C13 to charge to approximately 25 volts. When the capacitor C12 is charged, the FET transistor Q2 is turned off, thus providing resistor R2 in series with capacitor C13 across the telephone lines 26, thus keeping the leakage current below the five microamp maximum per FCC Part 68 requirements. The charging time constant is provided by capacitor C12, resistor R4 and resistor R3 through a zenner protection diode Z8. The leakage current is sufficient to maintain the charge on the power supply capacitor C13.

Figure 8:
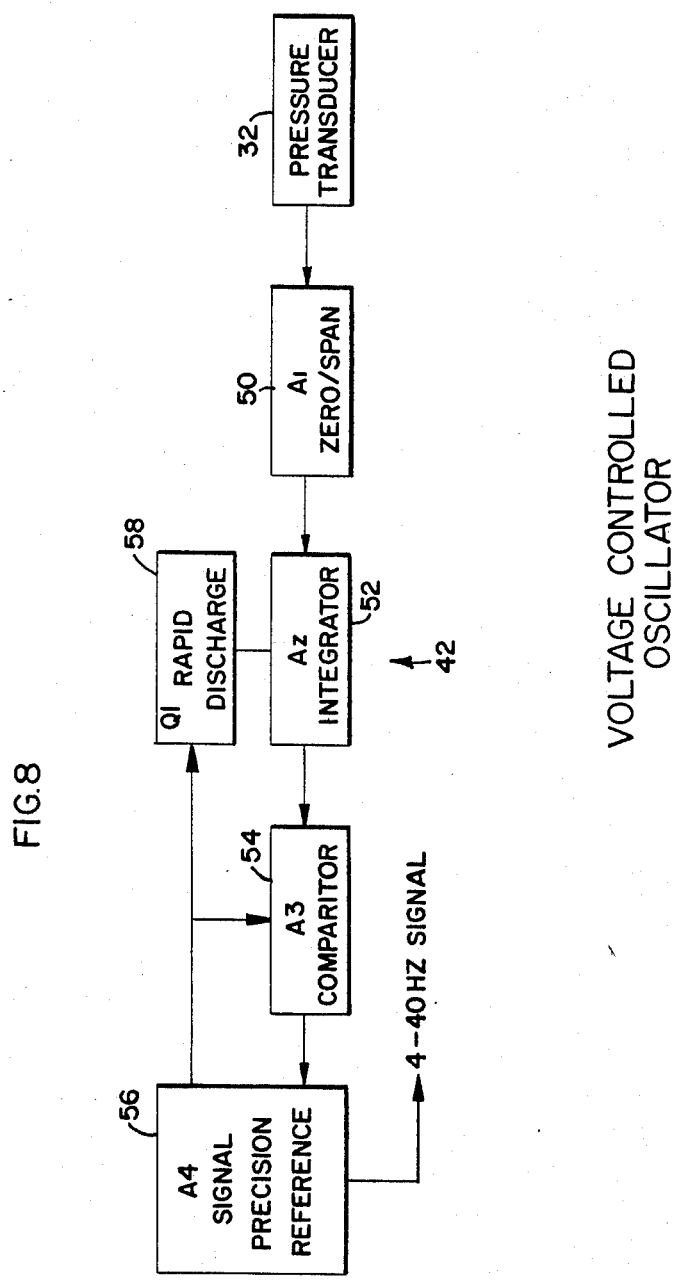
FIG. 8 is a functional block diagram of an embodiment of analog converter circuitry in accordance with the principles of the present invention.

The ANALOG 1 and ANALOG 2 circuitry 40, 42 are substantially identical. The ANALOG 1 and ANALOG 2 circuitry 40, 42 convert the analog inputs from the sensors 30, 32, respectively, to a frequency of from 4 to 40 Hz., which is representative of the analog input received and in the particular application shown, is representative of the fluid pressure and fluid flow which is sensed by the sensors 30, 32. The analog circuitry 40, 42 is capable of operating on five volt logic levels and represents a precision, temperature-stable, voltage controlled oscillator. A functional block diagram of the analog converter circuitry 42 is illustrated in FIG. 8. As previously indicated, the analog converter circuitry 40, 42 is substantially identical and therefore the description of analog circuitry 42 will also be applicable to analog converter circuitry 40. An operational amplifier circuit 50, including amplifier A1, provides zero and span control on the analog signal received from the pressure transducer 32. Operational amplifier circuitry 52, including amplifier A2, functions as the signal integrater, while operational amplifier circuitry 54, including amplifier A3, functions as the comparitor. Operational amplifier circuitry 56, including amplifier A4, provides a precision reference circuit. Rapid discharge circuit 58, including transistor Q1, causes the amplifier circuit 52 to rapidly integrate negative.

Figure 3B:
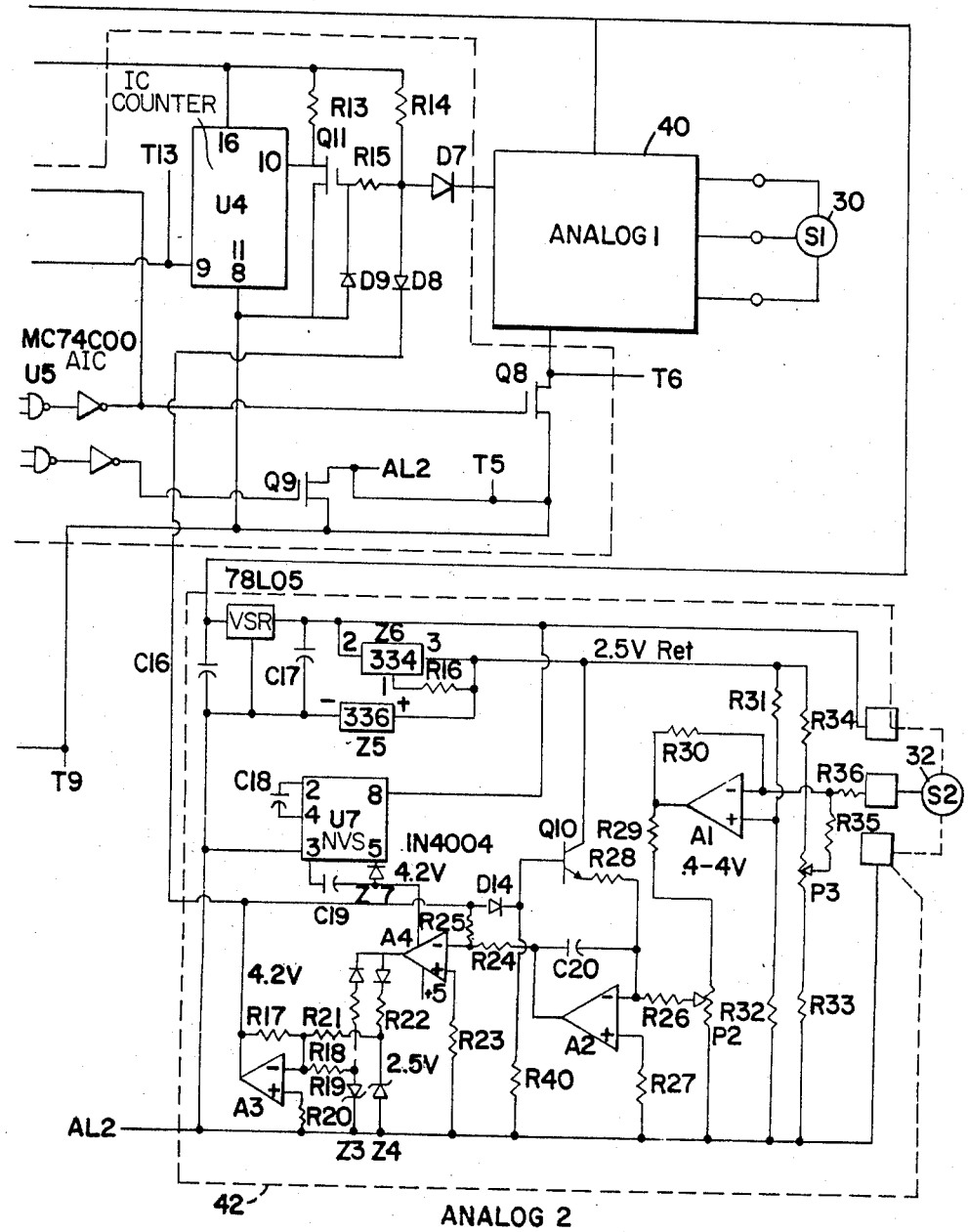

More particularly, as illustrated in the embodiment of the analog converter circuitry 42 shown in FIG. 3B, a voltage supply regulator 78L05, labeled VSR in FIGS. 3A–3B is used. Capacitors C16 and C17 on the input and output of the regulator 78L05 are used to suppress the white noise component on the five volt supply. Zenner diodes Z5 and Z6 form a precision 2.5 volt reference supply. Z5 is a 2.5 volt zenner and Z6 is a constant current source to the zenner Z5. The current supplied by Z6 is determined by resistor R16. Integrated circuit U7, labeled NVS in FIGS. 3A–3B, which is a ICL7660 integrated circuit, supplies a negative voltage from the positive five volts. The integrated circuit U7 oscillating frequency is determined by capacitor C18. The output of the integrated circuit U7 on terminal 5 is rectified by Diode Z7. Capacitor C19 is the filter for the negative voltage which forms the negative supply for the operational amplifiers.

The operational amplifier circuit 50 previously discussed provides the zero and span control of the input signal received from the sensor 32. Resistors R31 and R32 determine the operating voltage above zero for the operational amplifier A1. This voltage is near the output of the pressure transducer 32 with zero pressure applied. Resistors R33, R34, R35 and P3 are the fine zero adjustment. Resistor R36 is the input resistor for the pressure transducer 32. Resistor R30 determines the gain of the operational amplifier A1. Resistors R29 and P2 are the span control for the circuitry. The operational amplifier is selected for temperature stability of the circuit.

Operational amplifier circuit 52, as previously discussed, is the integrator. Resistor R26 and capacitor C20 determine the operating frequency of the integrator. Capacitor C20 is a NPO for temperature stability. Resistor R27 is the referencing resistor for operational amplifier A2. The output of the integrator circuitry 52 is applied to the comparitor circuitry 54.

As previously discussed, the operational amplifier circuitry 54 functions as the comparator. The output of the integrator circuit 52 is compared to the output of the signal precision reference from circuitry 56. When the output of the integrator exceeds the reference signal, the operational amplifier A3 will swing to the opposite supply rail. This is true in both negative and positive comparisons. The output of the comparitor circuit 54 is then applied to the signal precision reference circuit 56.

As previously discussed, the operational amplifier circuit 56 functions as the precision reference circuit. The output of the comparitor circuit 54 swings to both the positive and negative supply rails. When the output of the comparitor circuit 54 is negative, diode D12, resistor R21 and zenner Z3 provide a precision negative reference to operational amplifier A4. When the output of the comparitor circuit 54 is positive, diode D3, resistor R22 and zenner Z4 provide a precision positive reference to the operational amplifier A4. Resistors R18 and R19 are the operational amplifier's input resistors from the precision reference. Resistor R17 determines the gain and voltage swing of the operational amplifier A4. The output of the signal precision reference circuit 56 is applied to the comparitor circuit 54, the rapid discharge circuit 58 and the logic module 44.

As previously discussed, the rapid discharge circuit causes the integrator circuit 52 to rapidly integrate negative. The rapid discharge circuit 58 includes diode D14, resistors R28 and R37 and transistor Q10. When the output of the signal precision reference circuit 56 is positive, transistor Q1 is on, applying a 2.5 volt reference to the integrator three resistor R28 to the integrator. This causes the integrator circuit 52 to rapidly integrate negative.

In the embodiment shown, T1 through T14 represent test points for connections to a set or the like. The resistors in the embodiment shown have the following values:

| | | | |
|---|---|---|---|
| R1 = 10K | R13 = 10K | R25 = 10K | R37 = 1K |
| R2 = 10M | R14 = 10K | R26 = 100K | R38 = 1K |
| R3 = 1M | R15 = 1M | R27 = 100K | R39 = 1K |
| R4 = 6.8M | R16 = 47 | R28 = 1K | R40 = 6.8K |
| R5 = 82 | R17 = 16.9K | R29 = 5K | |
| R6 = 36 | R18 = 10K | R30 = 5K | |
| R7 = 1K | R19 = 10K | R31 = 10K | |
| R8 = Not Used | R20 = 4.99K | R32 = 5K | |
| R9 = 2.2K | R21 = 1K | R33 = 10K | |
| R10 = 220K | R22 = 1K | R34 = 1K | |
| R11 = 1M | R23 = 4.99K | R35 = 5K | |

-continued

| | | |
|---|---|---|
| R12 = 100K | R24 = 10K | R36 = 10K |

The capacitors in the embodiment shown have the following values in farads:

| | |
|---|---|
| C1 = .01 | C13 = 11,000 |
| C2 = .1 | C14 = .1 |
| C3 = 2.2 | C15 = .1 |
| C4 = 2.2 | C16 = .1 |
| C5 = 2.2 | C17 = .1 |
| C6 = 2.2 | C18 = 10u |
| C7 = .1 | C19 = 10u |
| C8 = .1 | C20 = .027 |
| C9 = 1u | C21 = .47 |
| C10 = 100p | C22 = .47 |
| C11 = 100p | C23 = 10u |
| C12 = .47u | |

It is to be understood that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A data transmitter unit for transmitting data over conventional telephone lines from a remote location to a central location, the data transmitter unit deriving its operational power supply from the telephone lines to which it is interconnected, thereby doing away with the requirement for a separate power supply, the data transmitter unit comprising:

(a) ring detector means interconnected to the telephone line for detecting a ring signal sent over the telephone line to the remote location from the central location and actuating the unit in response thereto;

(b) pulse rate frequency transmitter means interconnected to the telephone line for transmitting on the telephone line from the remote location to the central location pulses of a tone where the tone comnprises signals of one or more predetermined frequencies, the rate of the pulses and the one or more frequencies representing different types of data; and (c) charging circuit means interconnected to the telephone lines for providing power at the end of a transmission cycle to a stand-by power supply means for powering the data transmitter unit during a subsequent transmission cycle, the stand-by power supply means including capacitor means charged to a predetermined voltage.

2. A data transmitting system for transmitting data over conventional telephone lines from a remote location to a central location, the data transmitting system deriving its operational power supply from the telephone lines to which it is interconnected, thereby doing away with the requirement for a separate power supply, the data transmitting system comprising:

(a) ring detect means interconnected to the telephone lines for detecting a ring signal on the telephone lines;

(b) tone generator means interconnected to the telephone lines for transmitting tone signals on the telephone lines, said tone signals comprising signals of one or more frequencies selected from a selected from a predetermined set of frequencies and controlled by signal inputs from a logic means;

(c) the logic means being responsive to a sensor means for controlling operation of the tone generator means;

(d) the sensor means providing an analog output indicative of the sensed condition;

(e) oscillator means interconnected to the sensor means for converting the analog output of the sensor means to an output signal having a frequency representative of the analog output of the sensor means, the logic means being interconnected to the oscillator means for receipt of the output signal from the oscillator means, the logic means setting the one or more frequencies of the tone signals and pulsing the tone generator in response to the oscillator means output signal;

(f) standby power supply means cooperating with the ring detect means for energizing the oscillator means and the logic means when a ring signal is detected by the ring detect means; and (g) charging means interconnected to the telephone lines for charging the standby power supply for the next subsequent transmission cycle.

3. A data transmitting system for transmitting data over conventional telephone lines from a remote location to a central location, the data transmitting system deriving its operational power supply from the telephone lines to which it is interconnected, thereby doing away with the requirement for a separate power supply, the data transmitting system comprising:

(a) ring detect means interconnected to the telephone lines for detecting a ring signal on the telephone lines;

(b) tone generator means interconnected to the telephone lines for transmitting signals of a plurality of predetermined frequencies on the telephone lines, said signals of said predetermined frequencies transmitted alone or in combination and corresponding to a set of input signals from a logic means;

(c) power storage means cooperating with the ring detect means for energizing the tone generator means upon receipt of the ring signal, whereby the tone generator means goes to an "off hook" condition;

(d) a source of signals of variable-frequency;

(e) logic means interconnected to the the generator means and the source of signals of variable-frequency for selectively transmitting to the tone generator means, sensor-dependent frequency signals to control selection of the predetermined frequencies and to pulse the tone generator at a rate proportional to the variable frequency and a tone-generator de-energizing signal at the end of a transmission cycle.

4. A data conversion and transmission unit for converting sensed analog signals into pulse-rate-modified signals transmittable from a remote location to a central location over conventional telephone lines and having power derived from conventional telephone lines interconnected to the unit comprising:

(a) means for generating an oscillating signal;

(b) analog sensor receiving means for receiving analog signals proportionate to a value of a characteristic sensed;

(c) frequency modifying means for modifying the frequency of the oscillating signal proportionately to the signal received at the analog sensor receiving means;

(d) logic means for converting the frequency-modified oscillating signal into a pulse-rate-modified signal output readable by a tone generator means;

(e) tone generator means interconnected to conventional telephone lines and the logic means for converting said pulse-rate-modified signal into a pulsed tone signal having a pulse rate proportionate to the value of the characteristic sensed, said logic means also selecting one or more frequencies for said tone from a predetermined set of frequencies; and (f) charging circuit means interconnected to conventional telephone lines for providing power through leakage current during on-hook conditions at a voltage level adequate to operate the components comprising a data conversion and transmission unit.

5. The data conversion and transmission unit according to claim 4, wherein the tone generator means is further responsive to the open and closed states of a contact such that the signal output of the tone generator is further indicative of the state of the contact.

6. The data conversion and transmision unit according to claim 4, further comprising sensor selection means for selecting which analog value of a plurality of sensors is to modify the frequency of the oscillating signals at said frequency-modifying means, wherein said logic means are further responsive to said signal selecting means, said logic means generating signal readable by said tone generator such that said tone generator means generates pulse-rate-modified tones further indicative of which of the plurality of sensors has been selected.

* * * * *

UNITED STATES PATENT AND TRADEMARK OFFICE
CERTIFICATE OF CORRECTION

PATENT NO. : 4,691,344

DATED : September 1, 1987

INVENTOR(S) : Brown et al.

It is certified that error appears in the above-identified patent and that said Letters Patent is hereby corrected as shown below:

Col. 3, Line 5, "cf" should be --of--.

Col. 8, Line 48, "comnprises" should be --comprises--.

Col. 9, Line 4, delete "selected from a".

Signed and Sealed this

Twenty-ninth Day of August, 1989

Attest:

DONALD J. QUIGG

Attesting Officer

Commissioner of Patents and Trademarks